(12) United States Patent
Christopher et al.

(10) Patent No.: US 9,073,139 B2
(45) Date of Patent: Jul. 7, 2015

(54) WIRE ELECTRODE DRIVE PRESSURE ADJUSTMENT SYSTEM AND METHOD

(75) Inventors: Mark Richard Christopher, Neenah, WI (US); Gerald Peter Piechowski, Hortonville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 2152 days.

(21) Appl. No.: 11/502,865

(22) Filed: Aug. 10, 2006

(65) Prior Publication Data

US 2008/0035626 A1 Feb. 14, 2008

(51) Int. Cl.
B23K 9/12 (2006.01)
B23K 9/10 (2006.01)
B23K 9/133 (2006.01)
B23K 9/29 (2006.01)

(52) U.S. Cl.
CPC .............. *B23K 9/1336* (2013.01); *B23K 9/295* (2013.01)

(58) Field of Classification Search
CPC ........ B23K 9/1336; B23K 9/295; B23K 9/32; B23K 9/0956; B23K 9/282; G11B 15/29; B65H 27/00
USPC ......... 219/137.2, 137.7, 137.31, 136, 130.21, 219/138; 226/176, 186
See application file for complete search history.

(56) References Cited

U.S. PATENT DOCUMENTS

| | | | | |
|---|---|---|---|---|
| 2,272,158 A | * | 2/1942 | Anderson | 219/137.8 |
| 2,606,267 A | * | 8/1952 | McElrath, Jr. | 219/137.7 |
| 2,719,245 A | * | 9/1955 | Anderson | 314/69 |
| 2,925,170 A | * | 2/1960 | Rath et al. | 226/174 |
| 2,998,507 A | * | 8/1961 | Brennen et al. | 219/137.7 |
| 3,279,669 A | * | 10/1966 | Bernard et al. | 226/181 |
| 3,317,779 A | * | 5/1967 | Henderson | 314/5 |
| 3,344,305 A | * | 9/1967 | Ogden et al. | 314/69 |
| 3,371,681 A | * | 3/1968 | Thomas | 137/557 |
| 3,396,263 A | * | 8/1968 | Even et al. | 219/127 |
| 3,414,197 A | * | 12/1968 | Proust | 239/289 |
| 3,466,536 A | * | 9/1969 | Arnelo et al. | 324/234 |
| 3,524,956 A | * | 8/1970 | Rocklin | 219/76.14 |
| 3,562,577 A | * | 2/1971 | Kensrue | 314/71 |
| 3,630,425 A | * | 12/1971 | Wilkens | 226/108 |
| 3,898,419 A | * | 8/1975 | Smith | 219/137.7 |
| 4,482,797 A | * | 11/1984 | Shiramizu et al. | 219/137.61 |
| 4,791,271 A | * | 12/1988 | Thompson | 219/136 |
| 4,837,420 A | * | 6/1989 | Niinivaara | 219/137 R |
| 4,845,336 A | * | 7/1989 | Samokovliiski et al. | 219/137.2 |
| 4,954,690 A | * | 9/1990 | Kensrue | 219/137.31 |

(Continued)

FOREIGN PATENT DOCUMENTS

| | | | | |
|---|---|---|---|---|
| EP | 224669 A2 | * | 6/1987 | B23K 9/28 |
| GB | 2016984 A | * | 9/1979 | B23K 9/12 |

(Continued)

*Primary Examiner* — Dana Ross
*Assistant Examiner* — Hemant Mathew
(74) *Attorney, Agent, or Firm* — Fletcher Yoder P.C.

(57) ABSTRACT

A welding torch is provided that includes a motorized arrangement for advancing continuous electrode wires during welding. The torch has a pair of rollers that contact the electrode wire to force it through the torch during welding. A force adjustment selector is provided in the torch handle that allows the operator to alter the force or pressure applied to the electrode wire. Markings on the handle, or stops provided between the selector and the handle allow for easy adjustment and verification of the proper pressure or force applied for specific types of electrode wires.

20 Claims, 4 Drawing Sheets

(56) References Cited

U.S. PATENT DOCUMENTS

| | | | |
|---|---|---|---|
| 5,584,426 A * | 12/1996 | Ziesenis | 228/41 |
| 6,012,622 A * | 1/2000 | Weinger et al. | 227/8 |
| 6,064,036 A * | 5/2000 | Kensrue | 219/137.2 |
| 6,225,599 B1 * | 5/2001 | Altekruse | 219/137.31 |
| 6,568,578 B1 * | 5/2003 | Kensrue | 226/176 |
| 7,026,574 B2 * | 4/2006 | Belfiore et al. | 219/137.7 |
| 7,034,250 B2 * | 4/2006 | Kensrue | 219/137.7 |
| 2004/0200819 A1 * | 10/2004 | Kensrue | 219/137.7 |
| 2005/0040202 A1 * | 2/2005 | Kerekes et al. | 226/186 |
| 2005/0218129 A1 * | 10/2005 | Kensrue et al. | 219/137.31 |
| 2005/0218130 A1 * | 10/2005 | Kensrue | 219/137.31 |
| 2005/0247750 A1 * | 11/2005 | Burkholder et al. | 227/130 |

FOREIGN PATENT DOCUMENTS

| | | | | |
|---|---|---|---|---|
| WO | | 2006005096 A | 1/2006 | |
| WO | WO 2006005096 A1 * | | 1/2006 | B23K 9/133 |

* cited by examiner

WIRE ELECTRODE DRIVE PRESSURE ADJUSTMENT SYSTEM AND METHOD

BACKGROUND

The present invention relates generally to welding systems, and more particularly to a technique for advancing a wire electrode in a welding gun.

A wide range of welding techniques have been developed and are presently in use. Arc welding is a prominent and important class of welding in which an electric arc is established between a welding electrode and a work piece. The arc generally results from electrical power supplied to the electrode from a welding power supply. The power supply channels welding current to a welding gun or torch in which the electrode is placed. The gun is coupled to a cable that extends back to the power supply. The work piece is typically grounded, or at a polarity opposite that of the electrode. As the electrode is approached closely to or contacts the work piece, and arc is established that produces heat needed for melting either the work piece or the electrode or both.

One type of arc welding is generally referred to as metal inert gas (MIG) welding. In MIG welding, a continuous wire electrode is fed from a spool to the welding gun and from a tip of the welding gun to the location where the arc is established. The electrode is charged, such that the arc is established between the advancing wire electrode and the work piece. In many applications, an inert gas is also channeled to the welding gun tip to surround the weld and protect the weld both while the weld joint is molten and during solidification of the weld. Other wire electrode welding techniques do not use such gasses, but may rely upon a flux core within the wire electrode.

In welding applications employing wire electrodes, a challenge consists in driving the electrode toward the welding gun tip in a controlled and predictable manner. Current technologies for driving wire electrodes include driving one or more rollers that capture the continuous wire electrode therebetween, and drive the electrode towards the tip. The rollers are often positioned in the welding gun or handle itself, and a small drive motor powers a drive roller to advance the electrode, which is sandwiched between the moving rollers.

One difficulty in such arrangements is the need to provide the proper force or pressure on the electrode positioned between the rollers. Different sizes and types of wire electrode are available, and these typically require different roll pressures. For example, hand-held motorized welding torches may be used to feed relatively soft aluminum wire electrode (e.g., 4000 series), and also relatively harder aluminum wire electrodes (e.g., 5000 series) in a single handle arrangement. The softer electrodes require less roll pressure than the harder electrodes. If the roll pressure is too low, the wire electrode may seize in the contact tip of the torch. Excessive roll pressure, on the other hand, may cause the wire to be bent or wavy as it exits the contact tip. This waviness may complicate the welding operation by providing a relatively unpredictable location in which the electrode will contact the work piece. Electrode roll pressure is particularly problematic in pulsed MIG welding, where the harder aluminum wire electrode with an excessively low roll pressure will tend to withdraw an arc into the tip, and excessively high pressures will cause the electrode to drive through the point where the arc is concentrated, bending the wire.

Current approaches to adjustment of the roll pressure for motorized hand-held continuous electrodes basically rely upon trial and error in the adjustment process. The operator typically has little or no feedback from the device as to the level of pressure being applied on the electrode. Consequently, improper roll pressure in such applications is a continuing problem.

There is a need, therefore, for an improved technique for controlling roll pressure for advancement for continuous wire electrodes for welding applications. There is a particular need for a technique that provides user feedback and facilitates the adjustment operation when the nature of the electrode demands such adjustment.

BRIEF DESCRIPTION

The invention provides a novel arrangement for adjusting roll pressure in such applications designed to respond to these needs. The invention may be implemented in a range of welding settings, and is particularly well-suited to all continuous wire electrode applications, such as MIG welding. The invention is also particularly well-suited to arrangements in which a hand-held motorized welding torch allows for adjustment of roll pressure for continuous feed of wire electrodes. The electrodes may be flux cored electrodes or electrodes used with shielding gasses or other shielding media.

In accordance with certain aspects of the invention, a system for adjusting drive pressure on a continuous wire welding electrode is provided. The system includes a pair of rollers configured to capture the electrode wire therebetween. The rollers may be positioned in a motorized assembly within a welding torch. A pressure adjustment assembly is coupled to one of the rollers and configured to permit operator adjustment of a force urging the coupled roller towards the other roller. An operator indicator provides feedback to a welding operator of which of a plurality of preset force settings for the pressure adjustment assembly is currently set.

The arrangement may include a rotary adjustment mechanism, such as a screw that compresses a spring, the spring applying the desired force on an arm that supports one of the rollers. The feedback may be provided in the form of a mark or other indicia on the adjustment mechanism, along with marks on the torch handle that indicate either the force applied, or the electrode to which the force is matched, or some other indication of the current adjustment. The arrangement may further include one or more stops or detents that limit travel of the adjustment mechanism, further providing feedback to the operator and facilitating proper adjustment.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
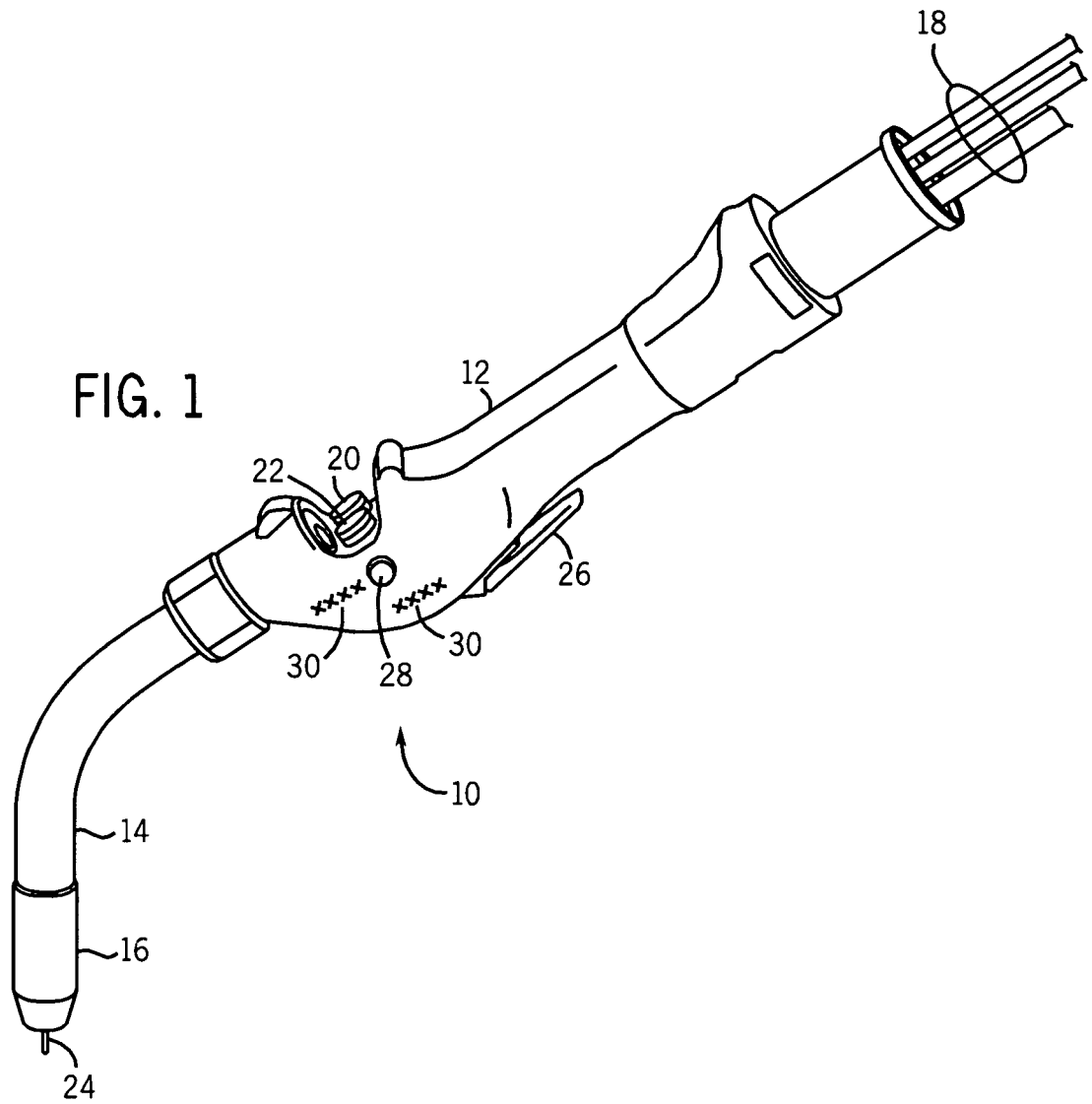
FIG. 1 is perspective view of an exemplary welding torch for MIG welding incorporating aspects of the present invention.

Turning now to the drawings, and referring first to FIG. 1, a welding torch is illustrated and designated generally by reference numeral 10. As will be appreciated by those skilled in the art, the torch, when placed in service, will be coupled to a source of welding power, as well as to other resources, such as a source of continuous wire electrode. The wire electrode and power source are typically provided in a welding base unit (not shown) which may be designed for drawing electrical power from the power grid or from a mobile power sources, such as an engine-driven generator (not shown). The welding resources, in the illustrated embodiment, may also typically include a source of inert gas which can be used to surround the electrode and weld during the welding operation. The illustrated welding torch is designed for MIG welding, such as with different sizes and grades of aluminum electrode wire.

The welding torch 10 shown in FIG. 1 has a body or handle 12 that terminates in a neck 14 and tip 16. In general, the welding resources, including the wire electrode, electrical power, and any shielding media will be delivered by a series of conduits 18 coupled to a rear end of the body 12 opposite the neck 14 and tip 16. A welding cable (not shown) is typically coupled to the conduits and provides a flexible link to the welding base unit. As will be appreciated by those skilled in the art, electrical current is conducted through one of these conduits in which the wire electrode passes. The electrode passes through the body 12 of the torch and is captured between rollers 20 and 22 which apply a drive pressure to the electrode sufficient to draw the electrode from a remote spool (not shown), through the handle, and to force the electrode through the neck 14 and tip 16. Within the tip 16, a contact tip (not shown) will contact the electrode and apply the welding current to it prior to exiting the torch. Ultimately, the electrode, indicated by reference numeral 24 in FIG. 1, will exit the torch at the location of a desired weld joint.

As will be appreciated by those skilled in the art, to control the advancement of the welding electrode, and the application of electrical power to the electrode, and the flow of shielding media, where provided, the torch 10 is provided with a trigger 26. The trigger, which is spring biased to an OFF position can be depressed to close an internal switch within the torch that activates the supply of welding resources. In particular, the switch (not shown) will energize a small electric motor that drives one or both of the rollers to advance the electrode toward the torch tip. In the illustrated embodiment, roller 20 is a drive roller, and includes a ridged or knurled outer surface that contacts the wire electrode. The other roller 22 is an idler in the present application. The rollers are urged into contact with the electrode as described in greater detail below.

In accordance with the present invention, and as illustrated in FIG. 1, the welding torch 10 includes a force or pressure adjustment selector 28 that can be manipulated to adjust the force or pressure applied between the rollers 20 and 22, and thereby to the wire electrode. Stops may be provided for pre-selected forces or pressures, as described below. Indicators 30 are also provided in the body 12 of the torch that offer visual indications of the force or pressure setting between the rollers. Those skilled in the art will recognize that, in the illustrated arrangement of FIG. 1, an upper enclosure panel or door has been removed for exemplary purposes. That is, in use, the rollers 20 and 22 are typically covered by a panel that can be opened and closed, and maintained closed, so as to avoid damage to the internal components of the handle or to the advancing wire electrode.

Figure 2:
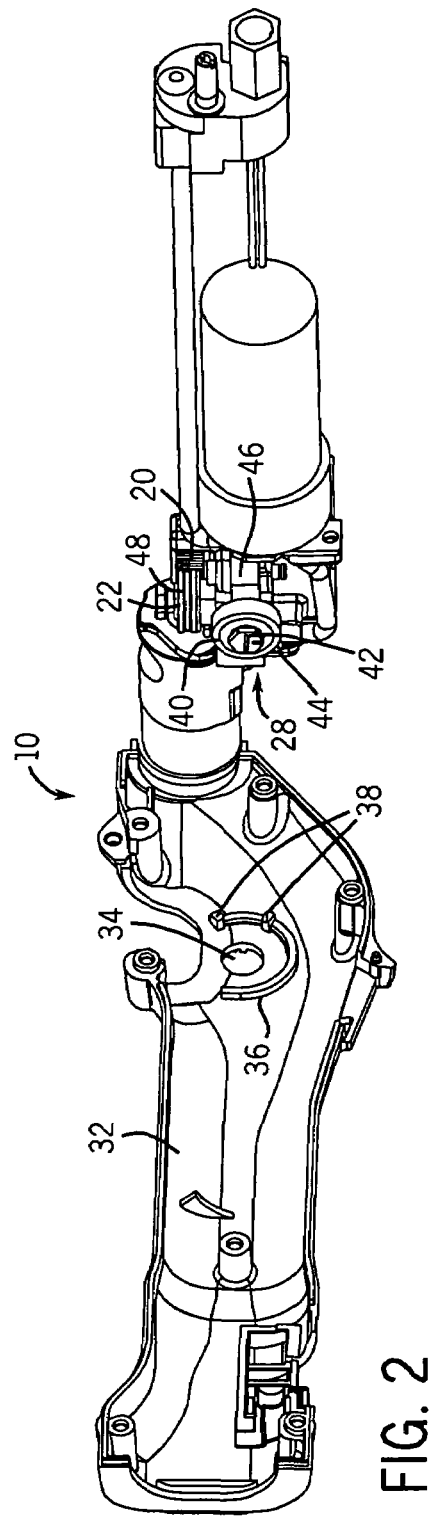
FIG. 2 is a partially opened handle of the type shown in FIG. 1 illustrating various parts of the roll pressure control arrangement of the invention.

FIG. 2 illustrates the same welding torch of FIG. 1 but with a back panel or handle shell removed, and with the handle shell shown in FIG. 1 rotated out to show both the components of the torch and the internal configuration of the torch handle. The handle shell 32 may, as in the illustrated embodiment, include internal features that facilitate adjustment of the drive roll pressure applied to the wire electrode. In the illustrated embodiment, the handle shell 32 is made of a hard moldable plastic material with features designed to permit access to the force adjustment selector 28. These include an aperture 34 through which the selector 28 is accessed and may be rotated. An internal rib 36 serves to maintain alignment of the force adjustment selector 28 once the handle is assembled. Moreover, optional stops or abutments 38 are provided that serve to limit travel or rotation of the force adjustment selector 28 as described in greater detail below.

In the illustrated embodiment, the force adjustment selector 28 includes a button 40 that has a central opening or slot 42 for forcing rotation of the selector. That is, a tool, such as a screwdriver, can be inserted into the slot to rotate the selector, with access being provided via the aperture 34 in the handle shell as described above.

Figure 3:
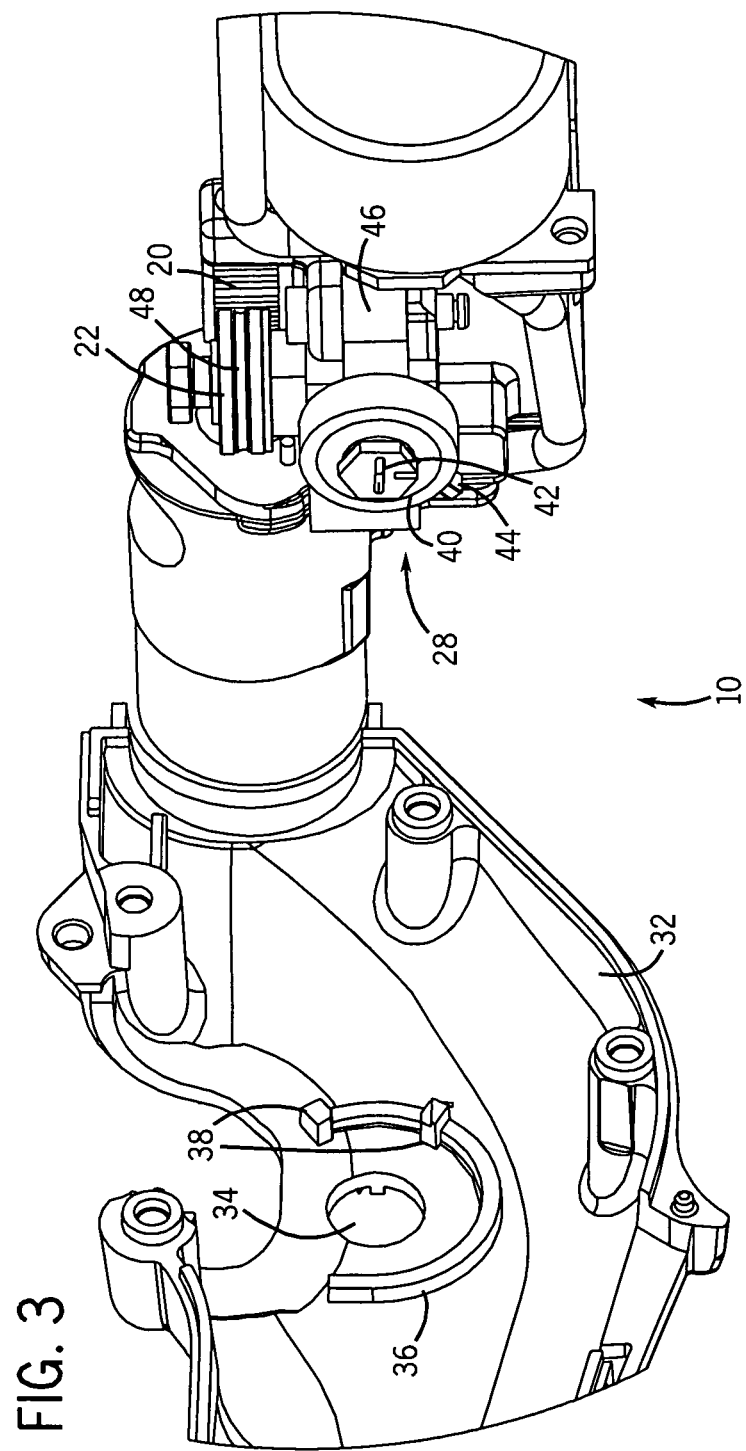
FIG. 3 is a more detailed view of the components shown in FIG. 2.

As best illustrated in FIG. 3, the button may also include an extension 44 that serves as a stop when abutments 38 are provided in the handle shell. That is, the button 40, upon assembly of the handle, is positioned radially inward of the rib 36, and can be rotated until the extension 44 contacts one of the abutments 38. The abutments, thus, limit rotation of the selector.

As shown in FIGS. 2 and 3, the idler roller 22 is disposed on a pressure arm 46 that can be pivoted generally horizontally in the illustrated view. That is, arm 46 on which the idler roller 22 is held, can be pivoted toward the left in the figures, but is urged toward the right by spring pressure as described below. A lever or cam (not shown in the figures) may be provided for drawing the arm toward the left against the spring pressure to open a space between the rollers 20 and 22, such as for initially inserting the wire electrode therebetween. The pivot point for arm 46 is slightly rear of the force adjustment selector 28 in the present embodiment. However, other arrangements may certainly be envisaged in which pressure is applied to the rollers through arms arranged differently, with pivot points differently positioned, as well as through other mechanical arrangements differing in style from that shown. The drive roller 20, as noted above, has ridges, knurled or contoured surfaces that can be seen best in FIG. 3, while the idler roller has a groove 48 for receiving and directing the wire electrode between the rollers (the electrode not being shown in the figures for clarity). In certain arrangements, the drive roller may not be ridged, but may include a groove similar to the idler roller.

Figure 4:
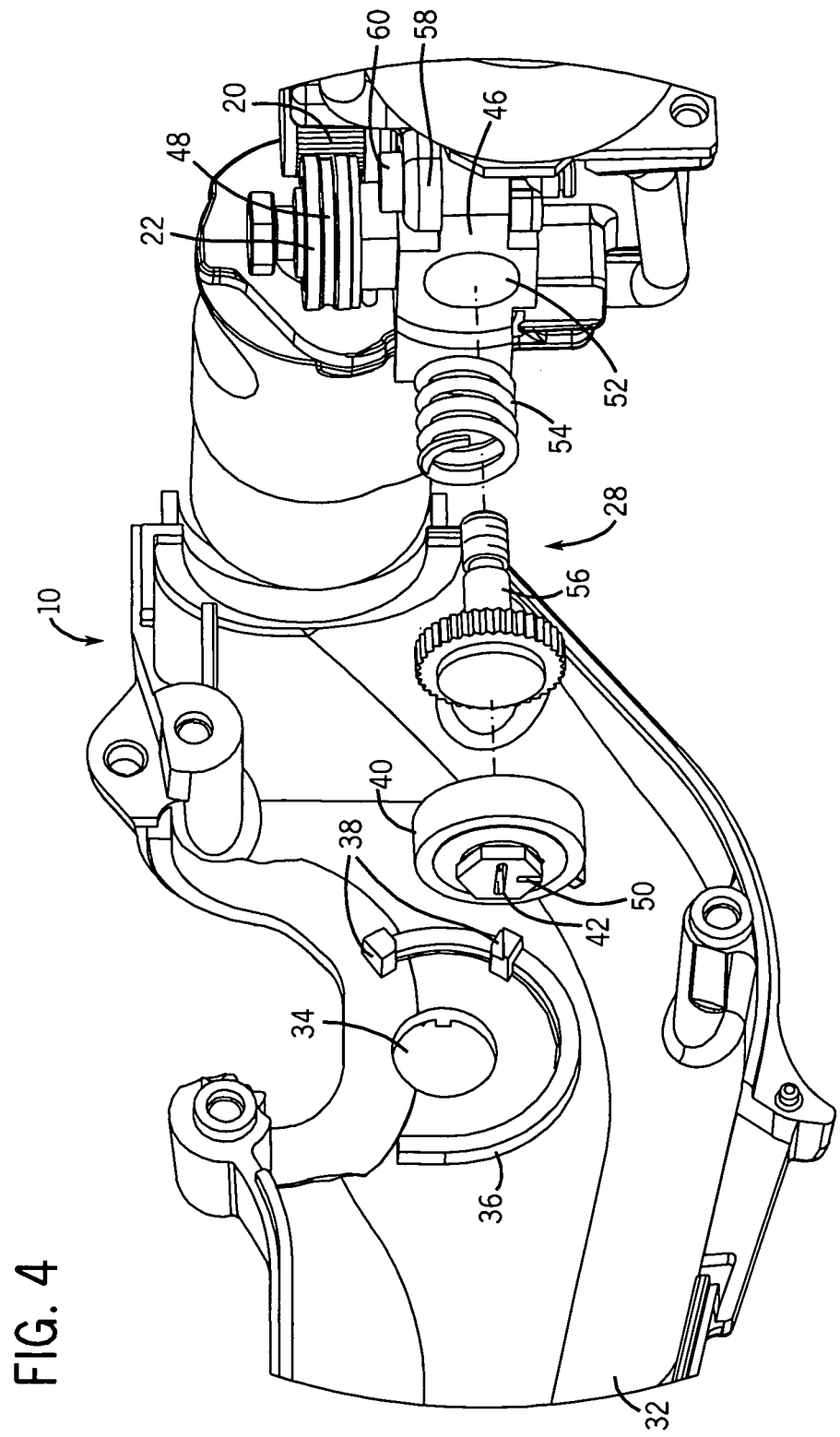
FIG. 4 is an exploded view of the components shown in FIG. 3, illustrating a present embodiment for controlling electrode drive roll pressure.

The same components are illustrated in FIG. 4, but with the basic components of the force adjustment selector 28 exploded to the left. In the present embodiment, the button 40 is provided with a position indicator 50, such as a mark or groove. As will be appreciated by those skilled in the art, the position indicator 50 may be aligned with the settings 30 indicated in FIG. 1 as the button is rotated by operator, providing a visual feedback of the position of the selector and thereby of the force or pressure setting corresponding to the rotational position of the indicator 50.

The pressure arm 46 has an aperture or recess 52 formed therein, in which a compression spring 54, or similar resilient force-creating member is positioned. A screw 56 extends through this spring and into aperture 52, and is threaded into a mounting member 58 or support structure on which the pressure arm is pivoted. In the illustrated embodiment, the pressure arm is held on the mounting member 58 via a pivot pin 60 about which the arm can pivot during adjustment of the assembly. The compression spring 54 is thus captured between a bottom annular surface (not shown) of the recess 52 in the pressure arm and the head of the screw 56. In a present embodiment, washers (not shown) are placed on either end of the spring to act as bearings, although the arrangement may be configured without these. Turning the screw 56 thereby compresses the spring 54 between the annular base of the pressure arm and the head of the screw. The degree of engagement of the screw with a corresponding threaded hole in the support structure on which the arm is mounted thereby determines the force or pressure exerted on the pressure arm, and thereby the force or pressure exerted between the rollers 20 and 22. The button 40 has an inner surface that interfaces with ridges or other torque-conveying structures formed in the head of the screw 56. Thus, rotation of the button 40 causes rotation of the screw 56, and alters the pressure between the rollers 20 and 22 by altering the distance between the bottom of the head of screw 56 and the surface internal to the pressure arm against which the compression spring 54 bears. As will be appreciated by those skilled in the art, the change in this distance, in combination with the spring constant of the compression spring 54, allows for various forces or pressures to be applied to the wire electrode when positioned between the rollers.

During assembly, prior to securing the handle shells on the welding torch, spring 54 is inserted into recess 52 of the pressure arm, and screw 56 is threaded into the threaded hole in the support member. The screw is then threaded into place to provide a desired preload to the compression spring 54 and thereby to the idler roll 22. Once the desired preload is achieved the button 40 is placed over the head of the compression spring 56 with the indicator 50 appropriately oriented for the preload force. Thereafter, the handle shell may be installed.

Referring back to FIG. 1, then, the selector 28 can be rotated as described above to adjust the compression of the spring 54 as shown in FIG. 4, and thereby the force or pressure applied to the idler roller 22. The settings 30 indicated by molded-in or added markings on the welding torch provide a guide and feedback for the welding operator for changing or setting the drive roll pressure, particularly useful when the type of electrode utilized is changed. In a present embodiment, for example, the settings 30 clearly indicate specific types of electrode wire, such as 4000 series aluminum wire electrode and 5000 series aluminum electrodes. More settings may, of course, be provided, as may settings for other types of wire electrodes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for adjusting drive pressure on a continuous welding electrode wire comprising:
    a torch handle;
    a pair of rollers disposed in the torch handle and configured to capture the continuous welding electrode wire therebetween;
    a pressure adjustment assembly coupled to one of the rollers and configured to permit operator adjustment of a force urging the coupled roller towards the other roller;
    an operator indicator providing feedback to a welding operator of which of a plurality of preset force settings for the pressure adjustment assembly is currently set, wherein the operator indicator includes indicia visible from outside the torch handle, wherein the indicia include markings on an external surface of the torch handle and a marking on the pressure adjustment assembly; and
    one or more stops for the pressure adjustment assembly corresponding to at least one of the preset force settings, wherein the one or more stops are provided on the torch handle and interface mechanically with an extension of the pressure adjustment assembly to limit travel of the assembly between predetermined limits to less than one turn.

2. The system of claim 1, wherein the pressure adjustment assembly includes a pressure arm on which the coupled roller is mounted, and a compression member that applies a preset force to the pressure arm.

3. The system of claim 2, wherein the pressure adjustment assembly further includes a threaded member that compresses the compression member between a surface thereof and the pressure arm.

4. The system of claim 3, wherein the operator indicator is provided on the threaded member.

5. The system of claim 3, wherein the threaded member includes a screw and a cap disposed on a head of the screw.

6. A system for adjusting drive pressure on a continuous welding electrode wire comprising, in a hand-held welding torch:
    a torch handle;
    a drive roller and an idler roller disposed in the torch handle configured to capture the continuous welding electrode wire therebetween;
    a pressure arm supporting the idler roller and movable to move the idler roller toward the drive roller;
    a compression member for exerting a force against the pressure arm to urge the idler roller towards the drive roller;
    an adjustment member configured to adjustably compress the compression member to adjust the force exerted against the pressure arm;
    an operator indicator providing feedback to a welding operator of which of a plurality of preset force settings is currently set by adjustment of the adjustment member, wherein the operator indicator includes indicia visible from outside the torch handle, wherein the indicia include markings on an external surface of the torch handle and a marking on the adjustment member; and
    one or more stops for the adjustment member corresponding to at least one of the preset force settings, wherein the one or more stops are provided on the torch handle and interface mechanically with an extension of the adjustment member to limit travel of the member between predetermined limits to less than one turn.

7. The system of claim 6, wherein the adjustment member includes a threaded member configured to be rotated to alter compression of the compression member.

8. The system of claim 7, wherein the operator indicator is provided on the threaded member.

9. The system of claim 8, wherein the operator indicator includes a marking on a head of the threaded member.

10. A method for adjusting drive pressure on a continuous welding electrode wire comprising:
    applying a force to at least one of a pair of rollers disposed in a welding torch handle and configured to capture the continuous welding electrode wire therebetween, the force being adjustable via a pressure adjustment assembly supporting at least one of the rollers;
    providing a visible indication to a welding operator of which of a plurality of preset force settings is currently set, wherein the visible indication is provided by markings on the pressure adjustment assembly and an external surface of the welding torch handle; and providing one or more stops for the pressure adjustment assembly corresponding to at least one of the preset force settings, wherein the one or more stops are provided on the welding torch handle and interface mechanically with an extension of the pressure adjustment assembly to limit travel of the assembly between predetermined limits to less than one turn.

11. The method of claim 10, wherein the pressure adjustment assembly includes a pressure arm, a compression spring and a threaded member that compresses the compression spring to exert an adjustable force on the pressure arm.

12. The system of claim 1, wherein the one or more stops are provided internally within the torch handle.

13. The system of claim 12, wherein the one or more stops are molded on an internal surface of the torch handle.

14. The system of claim 1, wherein the indicia indicate a specific type of electrode wire.

15. The system of claim 6, wherein the one or more stops are provided internally within the torch handle.

16. The system of claim 15, wherein the one or more stops are molded on an internal surface of the torch handle.

17. The system of claim 6, wherein the indicia indicate a specific type of electrode wire.

18. The method of claim 10, wherein the one or more stops are provided internally with the welding torch handle.

19. The method of claim 18, wherein the one or more stops are molded on an internal surface of the welding torch handle.

20. The method of claim 10, wherein the visible indication indicates a specific type of electrode wire.

\* \* \* \* \*